US009019533B2

(12) United States Patent
Pan

(10) Patent No.: US 9,019,533 B2
(45) Date of Patent: Apr. 28, 2015

(54) PRINTER RANKINGS IN CLOUD PRINTING

(71) Applicant: Pingping Pan, Cupertino, CA (US)

(72) Inventor: Pingping Pan, Cupertino, CA (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 13/691,704

(22) Filed: Nov. 30, 2012

(65) Prior Publication Data

US 2014/0153038 A1 Jun. 5, 2014

(51) Int. Cl.
G06F 15/00 (2006.01)
G06F 3/12 (2006.01)
G06K 1/00 (2006.01)
G06K 15/02 (2006.01)

(52) U.S. Cl.
CPC ............. G06K 15/02 (2013.01); G06F 3/1226 (2013.01); G06F 3/1273 (2013.01); G06F 3/1288 (2013.01); G06F 3/1211 (2013.01); G06F 3/126 (2013.01)

(58) Field of Classification Search
CPC ..... G06K 15/02; G06F 3/1226; G06F 3/1273; G06F 3/1288; G06F 3/1211; G06F 3/126
USPC ................................. 358/1.1, 1.15, 1.13, 1.14
See application file for complete search history.

(56) References Cited

U.S. PATENT DOCUMENTS 6,466,935 B1 * 10/2002 Stuart ................................. 1/1
6,621,589 B1 * 9/2003 Al-Kazily et al. ........... 358/1.15
2009/0273808 A1 11/2009 Kohli et al.
2012/0062912 A1 3/2012 St. Jacques et al.
2012/0243029 A1 9/2012 St. Jacques et al.

FOREIGN PATENT DOCUMENTS

WO WO2008/095180 A2 8/2008

OTHER PUBLICATIONS

European Patent Office, "Search Report" in application No. 13193596.7-1959, dated May 16, 2014, 6 pages.

* cited by examiner

*Primary Examiner* — Douglas Tran
(74) *Attorney, Agent, or Firm* — Hickman Palermo Becker Bingham LLP; Edward A. Becker

(57) ABSTRACT

An approach is provided for ranking cloud printing devices. A printing device ranking service is configured to retrieve printing device information data that specifies one or more attributes of a plurality of printing devices and print job data that specifies one or more attributes of a plurality of print jobs that have been processed by the plurality of printing devices. The printing device ranking service determines, based at least upon the printing device information data and the print job data, rankings data for the plurality of printing devices, wherein the rankings data indicate a ranking of the printing devices from the plurality of printing devices.

20 Claims, 19 Drawing Sheets

|  | Single Printing Device/ All Printing Devices | Single Printing Device/ Info-Specific Printing Devices | Info-Specific Printing Devices/ Info-Specific Printing Devices | Info-Specific Printing Devices/ All Printing Devices |
|---|---|---|---|---|
| Print Job Response Time | Calibration, No Grouping of Ranking Results | | Calibration, Grouping of Ranking Results | |
| Print Job Process Time | | | | |
| Print Job Process Result | No Calibration, No Grouping of Ranking Results | | No Calibration, Grouping of Ranking Results | |

(12)  United States Patent
US 9,019,533 B2

PRINTER RANKINGS IN CLOUD PRINTING

FIELD OF THE INVENTION

Embodiments relate generally to printing technology, and more specifically, to an approach for ranking cloud printing devices.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Cloud printing allows users to print electronic documents to any cloud-enabled printing device connected to the Internet. A "cloud-enabled" printing device is a printing device that includes hardware and/or software that enables the printing device to receive print jobs from a job print service in the cloud and to provide status data to the job print service. Cloud printing is very convenient in a wide variety of contexts. For example, cloud printing allows users to print electronic documents in public venues, for example to pay-for-print kiosks. Cloud printing also allows users to print electronic documents to the cloud and then later request printing from a particular cloud-enabled printing device. Cloud printing also provides businesses, for example coffee shops, to generate additional revenue from printers located in their businesses.

SUMMARY

An approach is provided for ranking cloud printing devices. A printing device ranking service is configured to retrieve printing device information data that specifies one or more attributes of a plurality of printing devices and print job data that specifies one or more attributes of a plurality of print jobs that have been processed by the plurality of printing devices. The printing device ranking service determines, based at least upon the printing device information data and the print job data, rankings data for the plurality of printing devices, wherein the rankings data indicate a ranking of the printing devices from the plurality of printing devices.

BRIEF DESCRIPTION OF THE DRAWINGS

In the figures of the accompanying drawings like reference numerals refer to similar elements.

FIG. 7B is a block diagram that depicts a table that depicts situations in which calibration and grouping of ranking results are used.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. OVERVIEW
II. SYSTEM ARCHITECTURE
III. PRINTING DEVICE RANKINGS
   A. Introduction
   B. Printing Device Information Data
   C. Print Job Data
   D. Printing Device Rankings Data
   E. Ranking Printing Devices
   F. Calibrating Print Job Data
   G. Alternative Ranking Approaches
   H. Ranking Example
   I. User Interface Examples
IV. IMPLEMENTATION MECHANISMS I. Overview An approach is provided for providing rankings of printing devices in cloud printing arrangements. A printing device ranking service retrieves printing device information data and print job data. The printing device information data specifies one or more attributes of a plurality of printing devices. Examples attributes of printing devices include, without limitation, an identification attribute, a name attribute, a brand attribute, a model attribute and a type attribute. The print job data specifies one or more attributes of a plurality of print jobs that have been processed by the plurality of printing devices. Examples of print job data include, without limitation, basic print job data, print job settings data and print job process data. The printing device ranking service determines, based at least upon the printing device information data and the print job data, rankings data for the plurality of printing devices.

II. System Architecture

Figure 1:
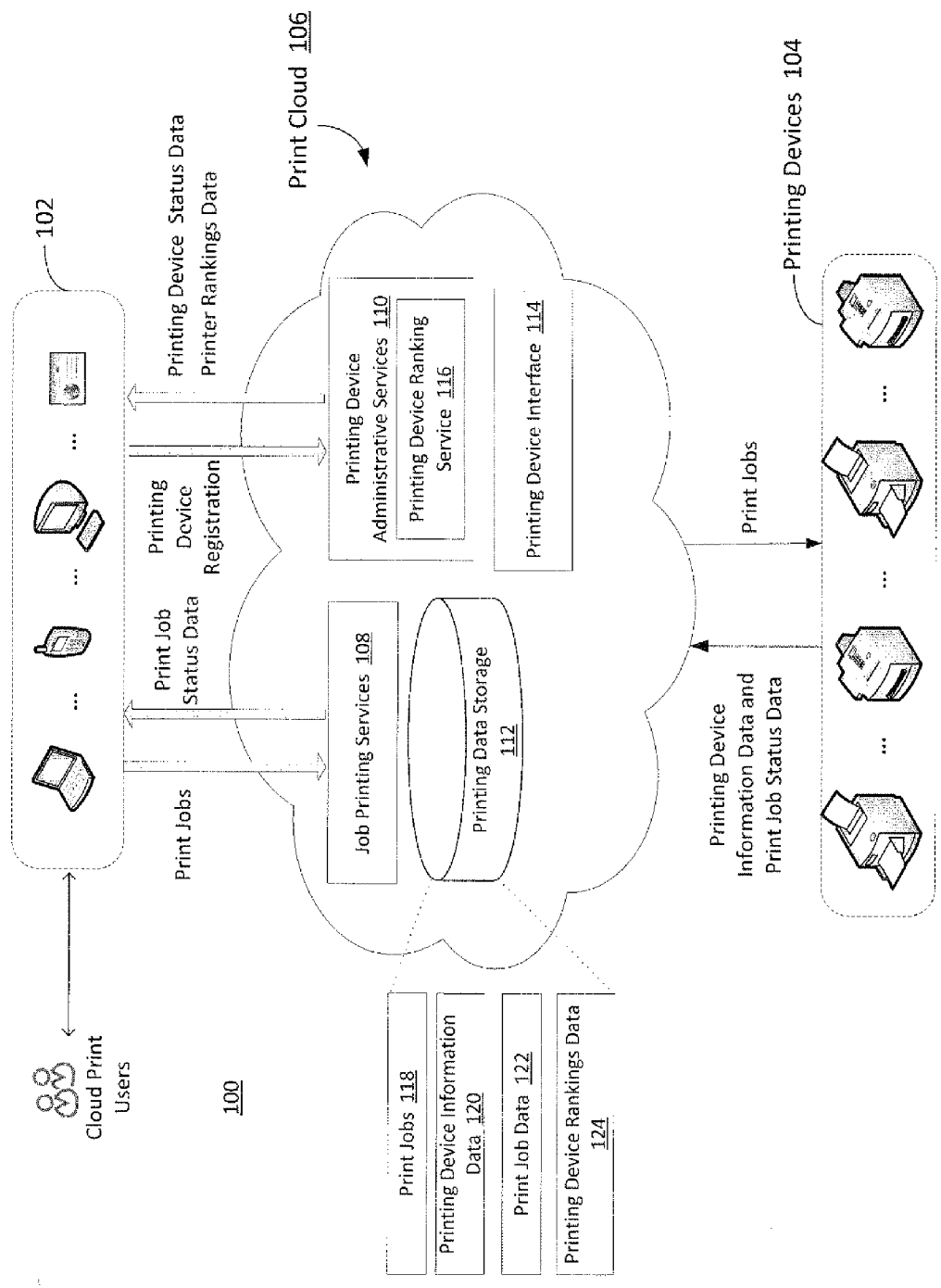
FIG. 1 is a block diagram that depicts an example cloud printing arrangement configured to provide printing device rankings.

FIG. 1 is a block diagram that depicts an example cloud printing arrangement 100 configured to provide printing device rankings in accordance with an embodiment. In the cloud printing arrangement 100, cloud print users interact with client devices 102 to print electronic documents on printing devices 104 via a print cloud 106. The approaches descried herein are not limited to any particular type of client devices 102 or printing devices 104. Example client devices 102 include, without limitation, workstations, desktop computers, laptop computers, tablet computers, telephony devices, personal digital assistants and other mobile devices. Examples of printing devices 104 include, without limitation, printers and any type of multi-function peripheral devices that include printing capability. Print cloud 106 may be implemented by any medium or mechanism that provides for the exchange of data between client devices 102 and printing devices 104. Print cloud 106 may be implemented using any type and combination of network elements including, without limitation, without limitation, Local Area Networks (LANs), Wide Area Networks (WANs), Ethernets or the Internet, and may include any number of terrestrial, satellite or wireless links.

In the present example, print cloud 106 includes job printing services 108, printing device administrative services 110, printing data storage 112 and printing device interface 114. Job printing services 108 receive print jobs from client devices 102 and store the print jobs in printing data storage 112. Job printing services 108 also provide print job status data to client devices 102. Printing device administrative services 110 may include a wide variety of services that allow for the registration and de-registration of printing devices 104 and also allow for printing device status data and printer rankings data to be provided to client devices 102. According to one embodiment, printing device administrative services 110 include a printing device ranking service 116 that provide printing device rankings as described in more detail hereinafter. Printing device ranking service 116 is depicted in FIG. 1 and described herein as being implemented in printing device administrative services 110 for purposes of explanation only and printing device ranking service 116 may be implemented elsewhere, for example elsewhere within print cloud 106 or external to print cloud 106, so long as printing device ranking service 116 has access to the data that printing device ranking service 116 needs to provide rankings, as described in more detail hereinafter. Printing data storage 112 may store a wide variety of data related to printing, depending upon a particular implementation. In the present example, printing data storage 112 stores print jobs 118, printing device information data 120, print job data 122 and printing device rankings data 124. Printing device interface 114 provides an interface between printing devices 104 and print cloud 106 and allows print jobs to be provided from the print cloud 106 to the printing devices 104 and for printing device information data and print job status data to be provided from the printing devices 104 to the print cloud 106. The various elements depicted in FIG. 1 are described in more detail hereinafter.

III. Printing Device Rankings
A. Introduction

Figure 2:
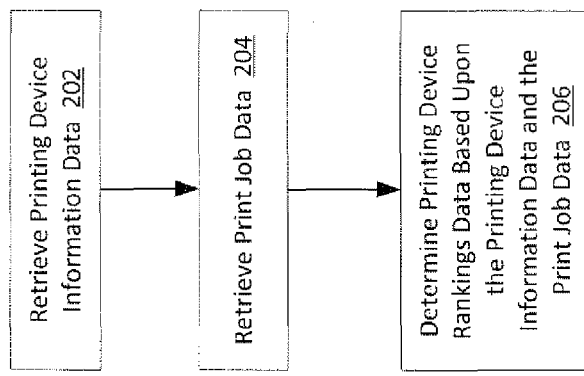
FIG. 2 is a flow diagram that depicts an approach for providing rankings of printing devices in cloud printing arrangements.

FIG. 2 is a flow diagram 200 that depicts an approach for providing rankings of printing devices in cloud printing arrangements according to an embodiment. In step 202, printing device information data is retrieved that specifies one or more attributes of a plurality of printing devices. Example printing device attributes include, without limitation, identification, name, brand, model and type. For example, printing device ranking service 116 may retrieve printing device information data 120 that specifies one or more attributes of printing devices 104. In step 204, print job data is retrieved that specifies one or more attributes of a plurality of print jobs that have been processed by the plurality of printing devices. For example, the printing device ranking service 116 retrieves print job data 122 that specifies one or more attributes of a plurality of print jobs that have been processed by printing devices 104. In step 206, printing device rankings data is determined for the plurality of printing devices based upon the printing device information data and the print job data. The printing device rankings data indicate a ranking of the plurality of printing devices. For example, the printing device ranking service 116 determines, based upon the printing device information data 120 and the print job data 122, printing device rankings data 124 for printing devices 104. As described in more detail hereinafter, rankings do not necessarily need to be determined for all of printing devices 104 and may be determined for a subset of printing devices 104. The printing device rankings data 124 is described in more detail hereinafter.

Figure 3:
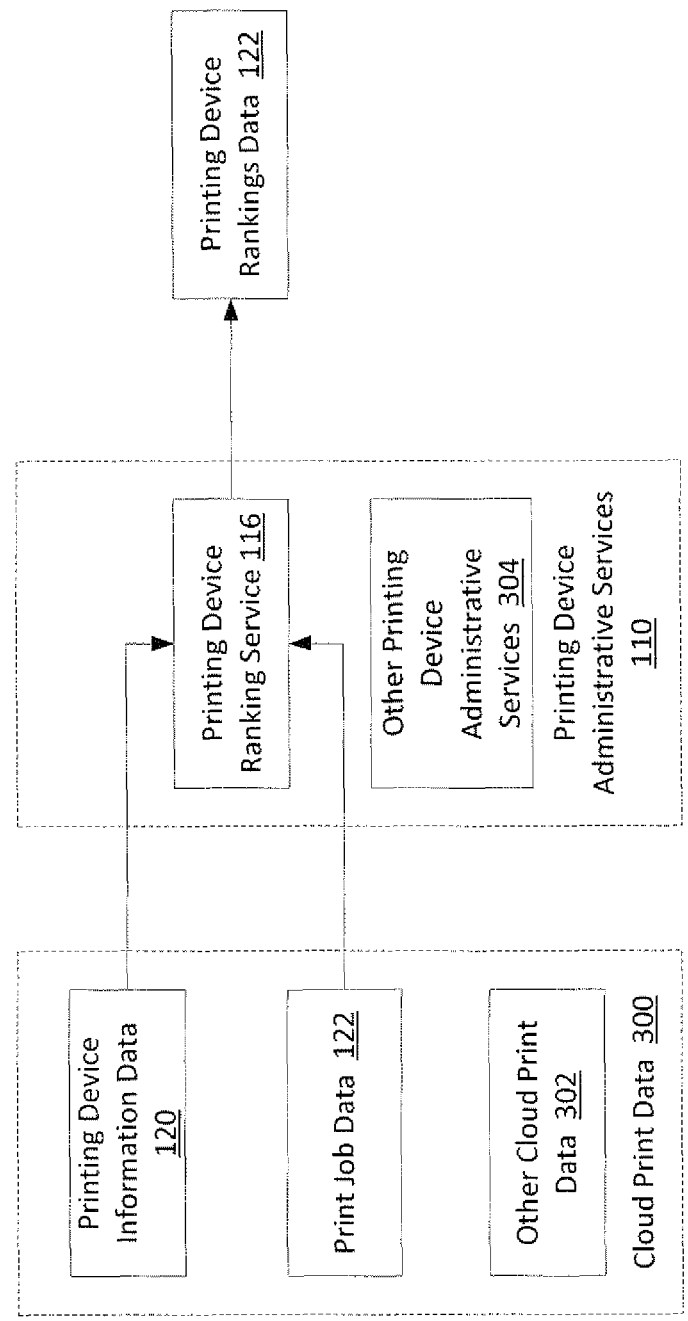
FIG. 3 is a block diagram that depicts how printing device rankings data is generated.

FIG. 3 is a block diagram that depicts how printing device rankings data 124 is generated. Cloud print data 300 includes the printing device information data 120, the print job data 122 and other cloud print data 302. The printing device administrative services 110 include the printing device ranking service 116 and other printing device administrative services 304. The printing device ranking service 116 processes the printing device information data 120 and the print job data 122 and generates the printing device rankings data 124. The other cloud print data 302 may include, for example, print jobs 118 or other data used by cloud print services. The other printing device administrative services 304 may include, for example, services that allow an administrator to configure the printing device ranking service 116.

B. Printing Device Information Data

Figure 4A:
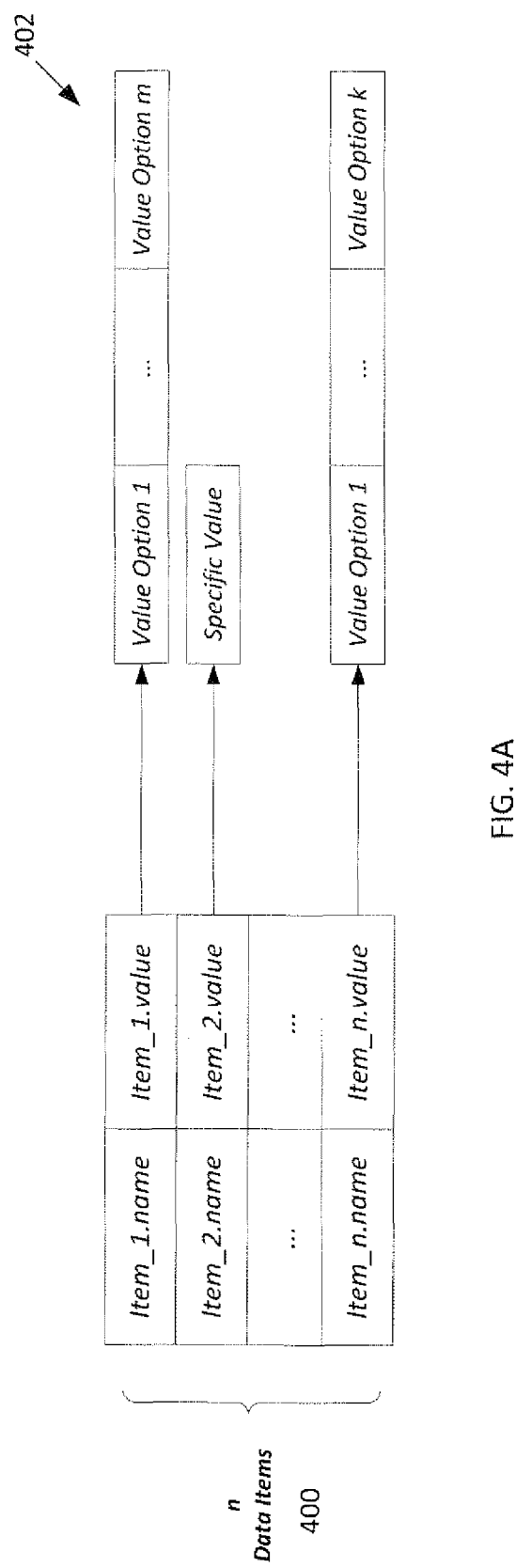
FIG. 4A is a block diagram that depicts an example data definition for printing device information data.

The format and content of printing device information data 120 may vary depending upon a particular implementation and the approaches described herein are not limited to any particular format or content of printing device information data 120. FIG. 4A is a block diagram that depicts an example data definition for printing device information data 120 according to one embodiment. In this example, printing device information data 120 includes n number of data items 400 identified as item_1.name, item_2.name . . . item_n-.name. Examples of data items 400 include, without limitation, identification, name, brand, model and type. Each data item 400 may have any number of value options 402, from a single specific value to m or k value options. For example, a type data item may have the values of desktop, multi-function peripheral (MFP), home commercial, heavy duty (HD), high capacity, etc.

Figure 4B:
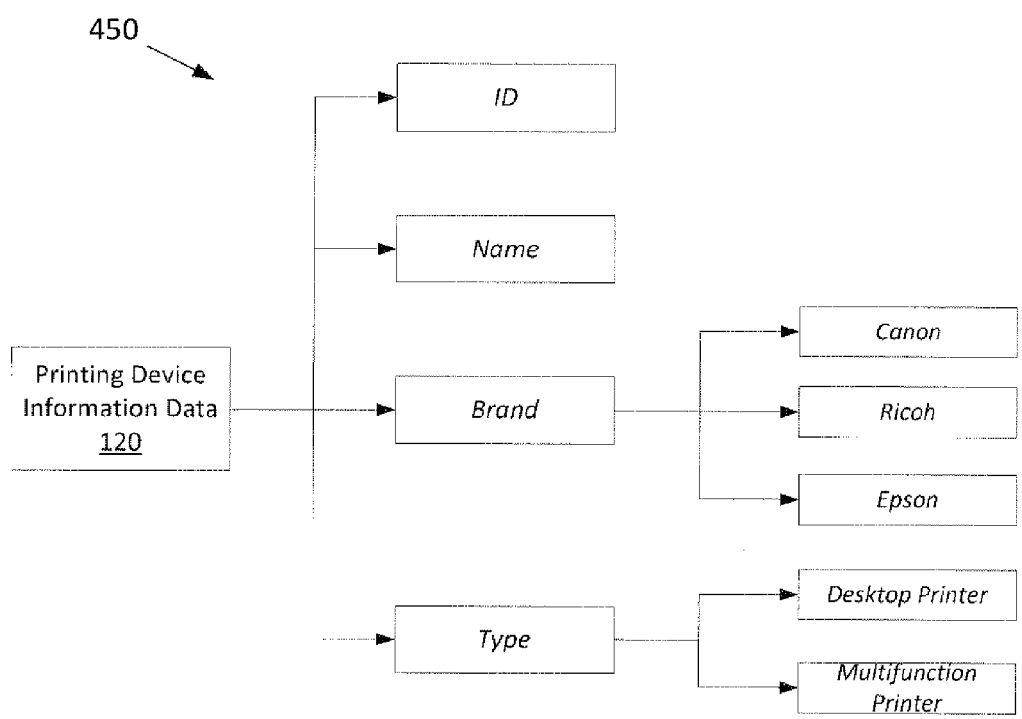
FIG. 4B is a block diagram that depicts an example instance of a printing device information data definition.

FIG. 4B is a block diagram that depicts an example data instance of a printing device information data 120 data definition according to an embodiment. In this example, the printing device information data 120 includes four data items, namely identification (ID), name, brand and type. The brand data item includes three values, namely, Canon, Ricoh and Epson. The type data item includes two values, namely, desktop printer and multifunction printer. Two example data instances of the example printing device information data 120 data definition depicted in FIG. 4B are as follows:

Printer1: {ID: "Printer1", Name: "Home Printer Device", Brand: "Canon", Type: "Desktop Printer"}

Printer2: {ID: "Printer2", Name: "Office MFP1", Brand: "Ricoh", Type: "Multifunction Printer"}

C. Print Job Data

Figure 5A:
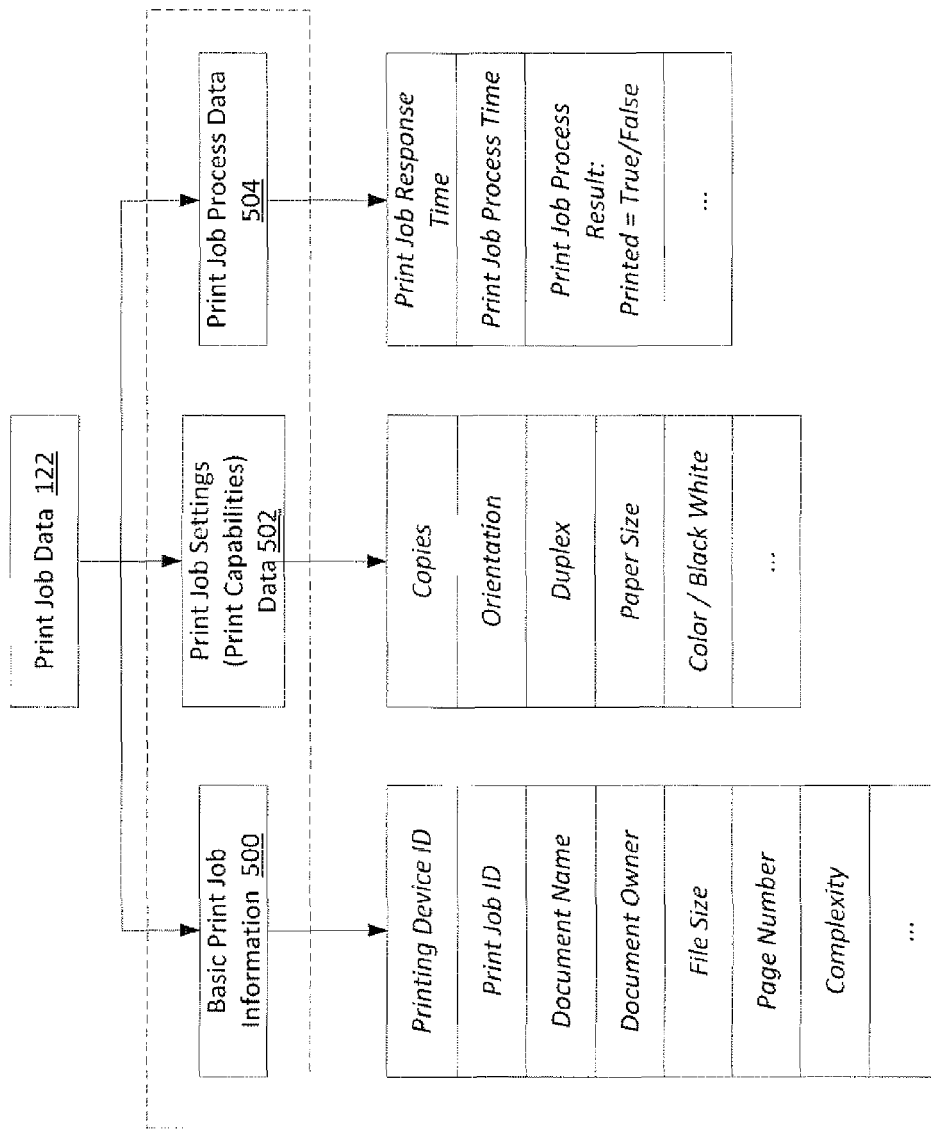
FIG. 5A is a block diagram that depicts an example data definition for print job data.

The format and content of print job data 122 may vary depending upon a particular implementation and the approaches described herein are not limited to any particular format or content of print job data 122. FIG. 5A is a block diagram that depicts an example data definition for print job data 122 according to an embodiment. In this example, print job data 122 includes basic print job information 500, print job settings (print capabilities) data 502 and print job process data 504. Basic print job information 500 generally includes information about or attributes of a print job that may vary depending upon a particular implementation and the embodiments are not limited to any particular types of information or attributes. In the example depicted in FIG. 5A, basic print job information 500 includes a Printing Device ID, a Print Job ID, a Document Name, a Document Owner, a File Size, a Page Number and a Complexity. The Printing Device ID identifies the destination printing device for the print job. The Printing Device ID may be any data that uniquely identifies a printing device. Examples of a Printing Device ID include, without limitation, a serial number, MAC address, or any other data that may uniquely identify a printing device. The Print Job ID is a value that uniquely identifies the print job and may be generated, for example, by a cloud printing service. Examples of a Print Job ID include, without limitation, a random number and a result of applying a hash function to a print job. The complexity data item indicates the complexity of the print job and may be determined, for example, using an algorithm that processes the print job and generates a quantitative value based upon attributes of the print job. The complexity value may be determined differently based upon the type of print job. For example, the complexity of a print job that contains only text may consider the amount of text, the size and font of text, resolution, etc. As another example, the complexity of a print job that contains image data may be based upon, for example, image file format, color depth, font size, image content, etc. Examples of algorithms for determining the complexity of a print job are described in U.S. Pat. Nos. 7,212,683 and 8,237,962 and in published U.S. Patent Application No. 20040085558.

The print job settings data 502 indicates the options specified for the print job, for example, number of copies, orientation, duplex, paper size, color/black & white, etc. The print job process data 504 generally indicates results of processing a print job and is used in determining rankings data for printing devices as described in more detail hereinafter. In the present example, the print job process data 504 includes a print job response time, a print job process time and a print job process result. The print job response time represents a time from which a cloud printing service requests that a printing device print a print job, or "pushes" a print job to a printing device, to a time at which the printing device confirms receipt of the request or the "pushed" print job. For example, the print job response time may be a time from which one of the job printing services 108 requests that a printing device 104 print a print job, or pushes the print job to the printing device 104, to a time at which the job printing service 108 receives a confirmation from the printing device. The print job process time is an amount of time for a printing device to process a print job. The print job process time may be measured from a time that a printing device confirms receipt of a request to process a print job, or receipt of a print job pushed to the printing device, to a time that a cloud printing service receives confirmation from the printing device that the print job has been processed. Alternatively, the print job process time may represent a time from which a cloud print service requests that a printing device process a print job to a time that a confirmation is received form the printing device that the print job has been processed. A print job process result is data that indicates whether a print job was successfully processed by a printing device. The form and content of print job process result data may vary depending upon a particular implementation and embodiments are not limited to any particular form or content. Examples of print job process result data include, without limitation, a Boolean value, a numerical value and an alphanumeric value or symbol.

Figure 5B:
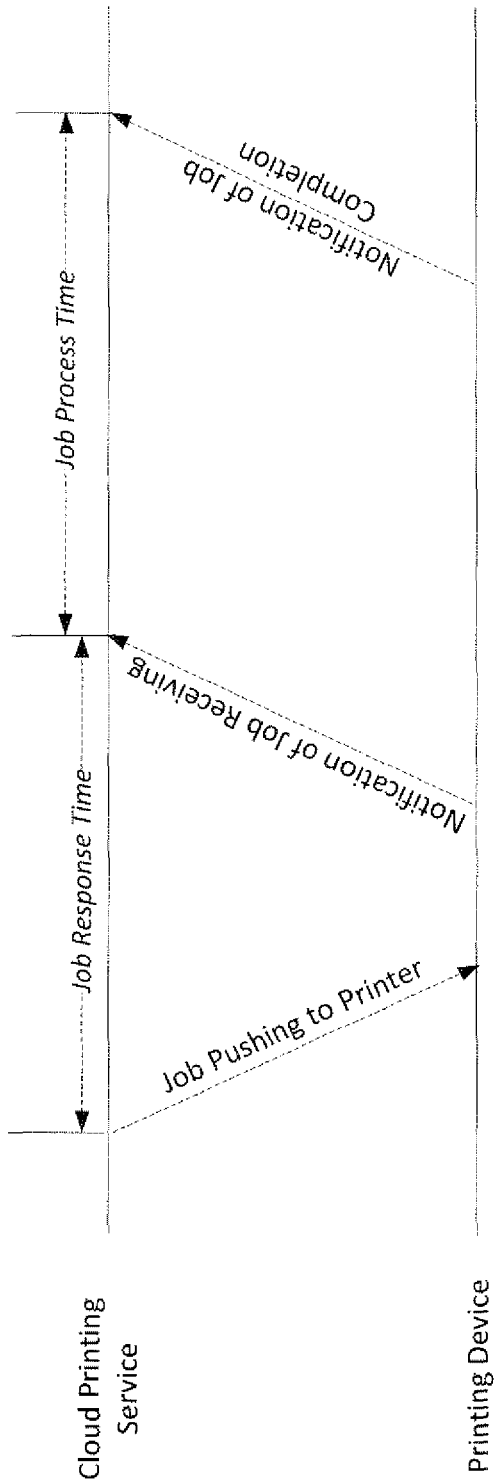
FIG. 5B is a block diagram that depicts a visual representation of a print job response time, a print job process time and a print job process result.

FIG. 5B is a block diagram that depicts a visual representation of a print job response time, a print job process time and a print job process result. As depicted in FIG. 5B, the job response time is measured from a time that the cloud printing service, such as one of the job printing services 108, pushes a print job to a printing device or requests that a printing device process a print job, to a time that the cloud printing service receives a notification from the printing device that the print job has been received by the printing device. The job process time is measured from the time that the cloud printing service receives the notification from the printing device that the print job has been received by the printing device to a time that the cloud printing service receives a confirmation from the printing device that the print job has been processed. The confirmation may be provided, for example, in a print job completion notification message that indicates the successful completion of a print job. In situations where an error prevents the successful completion of a print job, the print job completion message may indicate that the print job was not successfully completed and include error data, such as a code or message, that indicates one or more attributes of the error that prevented the successful completion of the print job.

Two example data instances of the example print job data 122 data definition depicted in FIGS. 5A and 5B are as follows:

Print Job 1: {Printer ID: "Printer1", Print Job ID: "Print Job 1", Document Name: "Word Document 1", Document Owner: "user 1", File Size: "2.5 MB", Page Number: "60", Complexity: "1.2", Copies: "2", Orientation: "Landscape", Duplex: "Off", Paper Size: "Letter", Color/Black White: "Color", Job Response Time: "3000 ms", Job Process Time: "15000 ms", Printed: "True"}

Print Job 2: {Printer ID: "Printer2", Print Job ID: "Print Job 2", Document Name: "Presentation Document 1", Document Owner: "user 2", File Size: "1.5 MB", Page Number: "25", Complexity: "0.8", Copies: "4", Orientation: "Landscape", Duplex: "Off", Paper Size: "Letter", Color/Black White: "Color", Job Response Time: "2000 ms", Job Process Time: "10000 ms", Printed: "True"}

D. Printing Device Rankings Data

Figure 6:
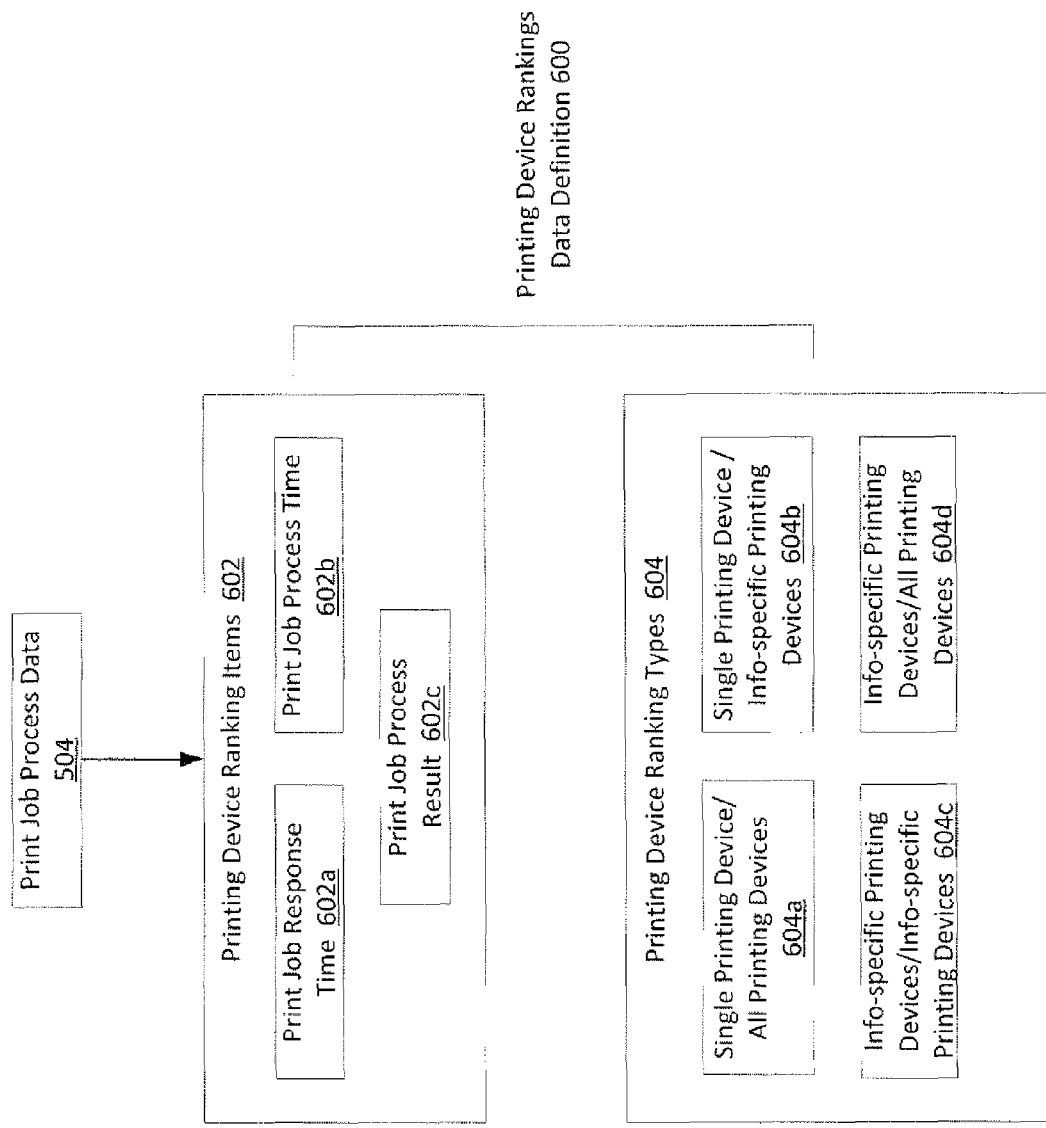
FIG. 6 is a block diagram that depicts an example printing device rankings data definition that includes printing device ranking items and printing device ranking types.

The format and content of printing device rankings data 124 may vary depending upon a particular implementation and the approaches described herein are not limited to any particular format or content of printing device rankings data 124. FIG. 6 is a block diagram that depicts an example printing device rankings data definition 600 that includes printing device ranking items 602 and printing device ranking types 604. The printing device ranking items 602 are data items upon which a printing device ranking may be determined and include items that are based upon the print job process data 504 determined for print jobs, such as print job response time 602a, print job process time 602b and print job process result 602c.

The printing device ranking types 604 are used to specify the scope of a ranking, i.e., the printing devices to which a ranking is to be applied. In the present example, the printing device ranking types 604 include a single printing device/all printing devices 604a, a single printing device/information-specific printing devices 604b, information-specific printing devices/information-specific printing devices 604c and information-specific printing devices/all printing devices 604d.

With the single printing device/all printing devices 604a ranking type, a single printing device is ranked within all printing devices. With the single printing device/information-specific printing devices 604b ranking type, a single printing device is ranked within printing devices having certain characteristics. For example, a single printing device may be ranked within printing devices of a specified type or brand.

With the information-specific printing devices/information-specific printing devices 604c ranking type, one or more printing devices having specified characteristics are ranked within one or more printing devices having specified characteristics. For example, all desktop printing devices of brand ABC may be ranked within all printing devices of brand ABC. With the information-specific printing devices/information-specific printing devices 604c ranking type, the printing devices in the numerator must represent a subset of the printing devices in the denominator. With the information-specific printing devices/all printing devices 604d ranking type, one or more printing devices having specified characteristics are ranked within all printing devices. For example, all printing devices of brand ABC may be ranked within all printing devices. As another example, all desktop printing devices of brand ABC may be ranked within all printing devices.

E. Ranking Printing Devices

Figure 7A:
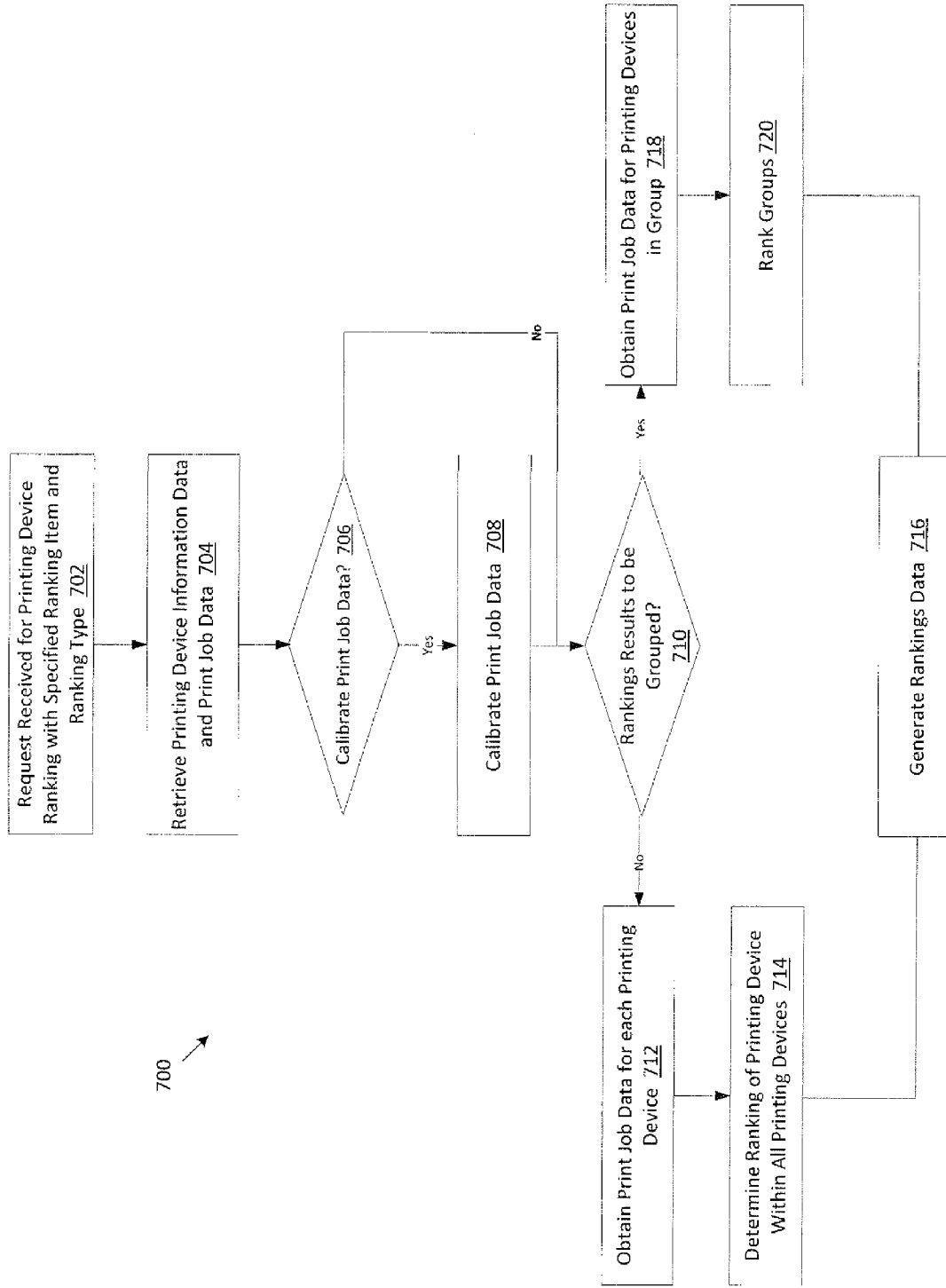
FIG. 7A is a flow diagram that depicts an approach for ranking cloud printing devices.

FIG. 7A is a flow diagram 700 that depicts an approach for ranking cloud printing devices according to an embodiment. In step 702, a request is received for a cloud printing device ranking. For example, printing device ranking service 116 may receive a request initiated by a client device 102. The request includes data that indicates a printing device ranking item 602, for example, print job response time 602a, print job process time 602b or a print job process result 602c, that will be used as a basis for ranking the printing devices. For example, the request may specify ranking by print job process time. As described in more detail hereinafter, a printing device ranking item 602 may be selected by a user using the user interface controls 1154 of FIG. 11D. The request also includes a printing device ranking type 604 that is used to specify the scope of the ranking and data that specifies parameters for the printing device ranking type 604. For example, the request may include data that specifies that a ranking is requested for a particular printing device among all printing devices. As another example, the request may include data that specifies that a ranking is requested for MFP printing devices of brand ABC among all brands of printing devices. As described in more detail hereinafter, a printing device ranking type 604 may be selected by a user using the user interface controls 1156 of FIG. 11D.

In step 704, the printing device information data 120 and print job data 122 are retrieved from printing data storage 112 for the printing devices that satisfy the printing device ranking type 604 specified in the request. For example, suppose that the request specified a ranking of a particular printing device within printing devices of brand ABC. In this example, the printing device information data 120 is used to identify printing devices of brand ABC and then retrieve the print job data 122 for those identified printing devices and for the particular printing device.

In step 706, a determination is made whether the retrieved print job data 122 for the printing device ranking item 602 specified in the request is to be calibrated. In the present example, the determination is whether the print job process time 602b data for printing devices of brand ABC are to be calibrated. The process of calibration improves the rankings of printing devices by standardizing the processing results for multiple print jobs using an approach that accounts for differences in the values for the basic print job information 500 of the print jobs and the values of the print job settings data 502 used to process the print jobs.

If, in step 706, a determination is made that the retrieved print job data 122 for the printing device ranking item 602 specified in the request is to be calibrated, then in step 708, the retrieved print job data 122 for the printing device ranking item 602 specified in the request is calibrated. If, in step 706, a determination is made that the retrieved print job data 122 for the printing device ranking item 602 specified in the request is not to be calibrated, then the process proceeds to 710 without calibration.

In step 710 a determination is made whether the ranking results are to be grouped, based upon the printing device ranking type 604 and parameters specified in the request. For example, if the original request requested a ranking of a particular printing device within all printing devices, or within printing devices having particular characteristics, e.g., printing devices of a specified brand or type, then the ranking results will not be grouped. Alternatively, if the original request requested a ranking of all printing devices by type within all printing devices, then the ranking results will be grouped by printing device type. As another example, if the original request requested a ranking of all printing devices by brand within all printing devices, then the ranking results will be grouped by printing device brand. If, in step 710, a determination is made that the ranking results are not to be grouped, then in step 712, the print job data 122 is obtained for each printing device and in step 714, the ranking is performed with respect to all printing devices. In step 716, rankings data is generated that indicates the determined rankings. If, in step 710, a determination is made that the ranking results are to be grouped, then in step 718, the print job data 122 is obtained for the printing devices in each group and in step 720, the printing device groups are ranked. For example, the print job process time for each printing device within each group may be used to determine an average print job process time for each group of printing devices. The average print job process time for each group is used to rank the groups. For example, the group of printing devices having the shortest average print job process time would be ranked highest while the group of printing devices having the longest average print job process time would be ranked lowest. In step 716, rankings data is generated that indicates the determined rankings. For example, the rankings data may specify an order in which the groups are ranked, e.g., from highest to lowest.

FIG. 7B is a block diagram that depicts a table 750 that depicts situations in which calibration and grouping of ranking results are used, according to one embodiment. As depicted in FIG. 7B, calibration is used when the print job response time or the print job process time is requested as the printing device ranking item 602, but is not used when the print job process result, which may be expressed as a printed rate, is requested as the printing device ranking item 602. Ranking results are not grouped for requests that involve a single printing device with respect to all printing devices or a subset of all printing devices, since the requests are made for a single printing device. Ranking results are grouped for requests to rank printing devices having specified attributes with respect to either printing devices having specified attributes or with respect to all printing devices.

F. Calibrating Print Job Data

Figure 8A:
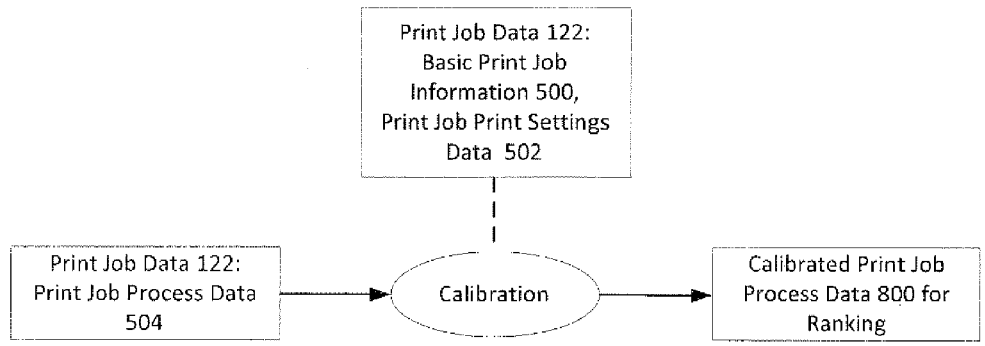
FIG. 8A depicts an approach for calibrating print job data.

FIG. 8A depicts an approach for calibrating print job data 122 according to an embodiment. Print job process data 504 is calibrated based upon the basic print job information 500 and the print job settings data 502 to generate calibrated print job process data 800 that is used to rank printing devices. Using calibrated print job process data 800 to rank printing devices may provide a more accurate ranking because the calibrated print job process data 800 takes into account the values of basic print job information 500 for each print job and the print job print settings data 502 that were used to process each print job when the print job process data 504 was collected. As a simple example, suppose that print job process time is used to rank printing devices. The amount of time required to process a particular print job depends upon the size of the particular print job, so ranking printing devices based upon the average print job process time, without taking into consideration the size of those print jobs, may provide an inaccurate ranking.

Figure 8B:
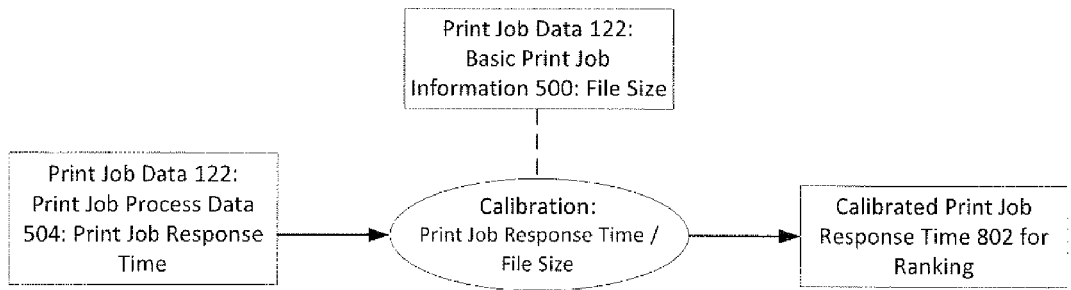
FIG. 8B depicts an approach for generating a calibrated print job response time.

FIG. 8B depicts an approach for generating a calibrated print job response time according to an embodiment. In this example, a calibrated print job response time 802 is generated based upon a raw print job response time and a file size. In particular, a print job response time from the print job process data 504 is divided by a file size from the basic print job information 500 to obtain a calibrated print job response time 802 that is expressed in an amount of time per file size unit.

Figure 8C:
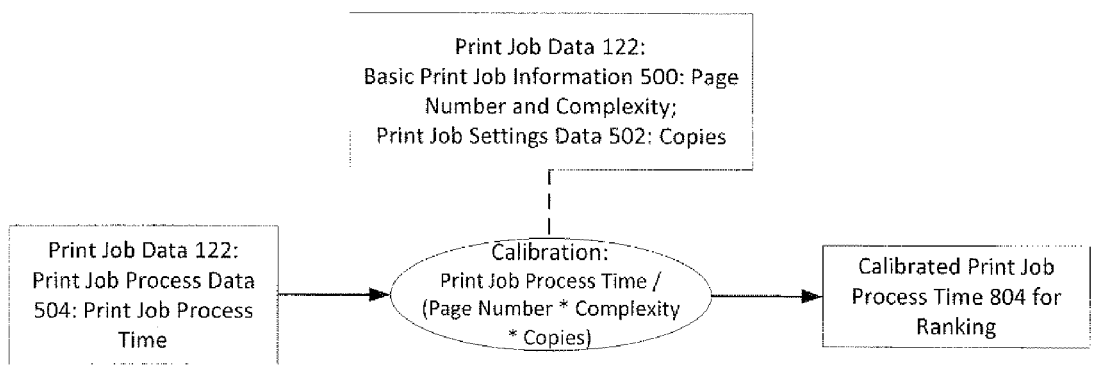
FIG. 8C depicts an approach for generating a calibrated print job process time.

Two example calculations of the calibrated print job response time 802 are as follows:

Print Job 1: for a file size of 2.5 Mb and a print job response time of 3000 ms, the calibrated print job response time 802 is 3000/2.5=1200 ms/Mb Print Job 2: for a file size of 1.5 Mb and a print job response time of 2000 ms, the calibrated print job response time 802 is 2000/1.5=1333 ms/Mb FIG. 8C depicts an approach for generating a calibrated print job process time according to an embodiment. In this example, a calibrated print job process time 804 is generated based upon a raw print job process time, a page number, a complexity and copies. In particular, a print job process time from the print job process data 504 is divided by the product of the page number (number of pages) and the complexity, both from the basic print job information 500, and the copies (number of copies) from the print job settings data 502 to obtain a calibrated print job process time 804 that is expressed in a unit of time.

Two example calculations of the calibrated print job process time 804 are as follows:

Print Job 1: for a page number of 60, a complexity of 1.2, a copies of 2 and a print job process of 15000 ms, the calibrated print job process time 804 is 15000/(60*1.2*2)=104 ms Print Job 2: for a page number of 25, a complexity of 0.8, a copies of 4 and a print job process time of 10000 ms, the calibrated print job process time 804 is 10000/(25*0.8*4) =125 ms These examples demonstrate approaches for standardizing the calculation of calibrated print job process data 800 that accounts for differences in basic print job information 500 and print job settings data 502 between print jobs, which in turn may provide a more accurate ranking of printing devices. For example, printing device ranking service 116 may use the calibrated print job process times of 104 ms and 125 ms to rank printing devices instead of the original 15000 ms and 10000 ms raw print job process times.

G. Alternative Ranking Approaches

In situations where a large number of print jobs are processed on a large number of printing devices, the amount of print job data 122 may grow to be quite large, consuming a significant amount of storage resources and computational resources when rankings are determined. Techniques are provided to reduce the amount of storage resources and computational resources required to determine rankings of cloud printing devices. According to one embodiment, ranking track data items are defined and maintained for printing devices. The ranking track data items include average print job response time, average print job process time, the total number of processed print jobs and the total number of successfully processed print jobs. The total number of processed print jobs and the total number of successfully processed print jobs may be used to determine a print job printed rate or success rate for a printing device. The ranking track data items may be assigned initial values that are then updated as print jobs are processed.

Figure 9A:
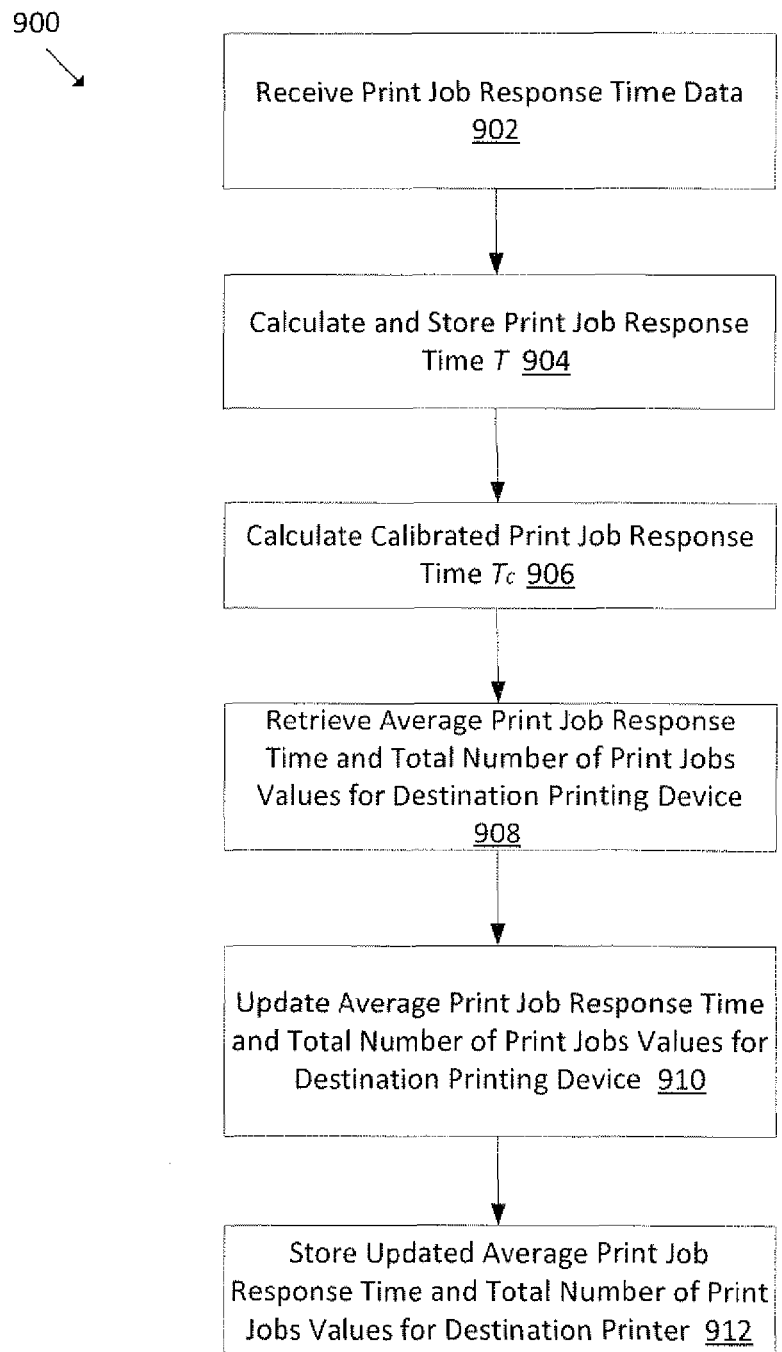
FIG. 9A depicts a flow diagram for updating the average print job response time for a printing device.

FIG. 9A depicts a flow diagram 900 for updating the average print job response time for a printing device. Similar approaches may be used to update the average print job process time and the print job printed rate or success rate. In step 902, print job response time data is received for a particular printing device. The response time data may include, for example, a time at which a request was sent to the printing device or a time at which a print job was pushed to the printing device, and a time at which a notification is received from the printing device. In step 904, a print job response time T is calculated and stored for the printing device. The print job response time may be calculated, for example, by subtracting the time at which a request was sent to the printing device or the time at which a print job was pushed to the printing device from the time at which a notification was received from the printing device. The print job response time may be stored, for example, in printing data storage 112.

In step 906, a calibrated print job response time $T_c$ is calculated. The calibrated print job response time $T_c$ may be calculated, for example, based upon the basic print job information 500, and the print job settings data 502 for the printing device. In step 908, the average print job response time and the total number of print jobs values are retrieved for the printing device. In step 910, the average print job response time and the total number of print jobs values are updated for the printing device as follows:

$Avg'=(Avg*N+T_c)/(N+1)$, where Avg is the average print job response time and N is the total number of print jobs, and $N'=N+1$ In step 912, the updated average print job response time (Avg') and the updated total number of print jobs (N') values for the printing device are stored, for example in printing data storage 112.

Figure 9B:
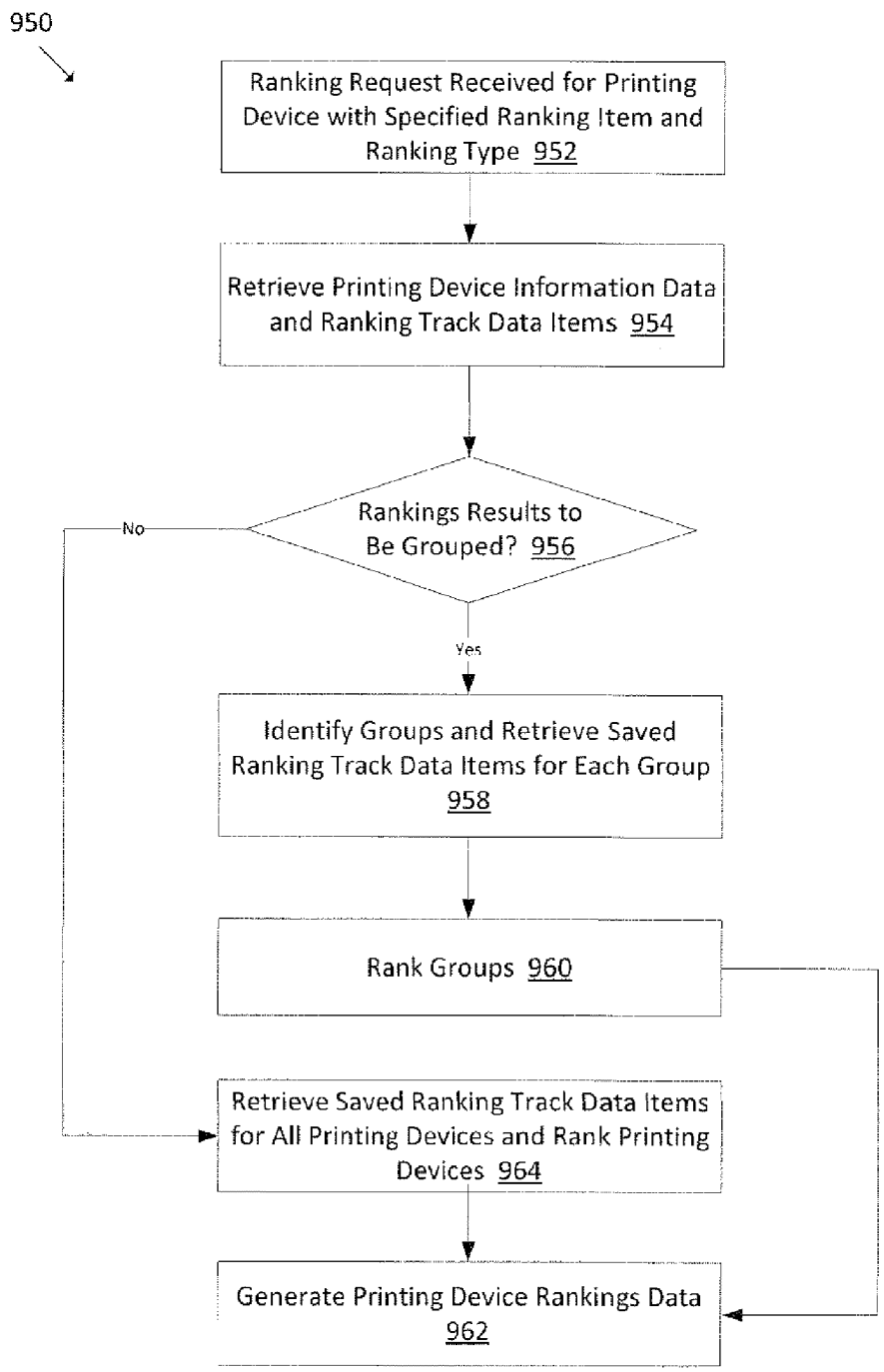
FIG. 9B is a flow diagram that depicts an approach for ranking cloud printing devices using ranking track data items.

FIG. 9B is a flow diagram 950 that depicts an approach for ranking cloud printing devices using ranking track data items according to an embodiment. In step 952, a ranking request is received with a specified ranking item and ranking type, as previously described with respect to FIG. 7A. In step 954, the printing device information data and ranking track data items are retrieved for the printing devices specified in the ranking request. The ranking request may specify a single printing device or multiple printing devices, for example, by indicating attributes of printing devices to be ranked.

In step 956, a determination is made whether the rankings results are to be grouped based upon the printing device ranking type 604 and parameters specified in the request, as previously described herein with respect to FIG. 7A. If the rankings results are to be grouped, then in step 958, the groups are identified and the saved ranking track data items are retrieved for each group. For example, the average print job response time, average print job process time, the total number of processed print jobs and the total number of successfully processed print jobs are retrieved for each printing device in a group. In step 960, the printing devices groups are ranked. The ranking of groups may be performed, for example, by determining an average value of the print job response time, print job process time or success rate for each group based upon the printing devices in each group. The average value for each group is used to rank the groups. In step 962, printing device rankings results are generated. For example, the printing device ranking service 116 generates printing device rankings data that specifies the rankings of printing devices and stores the printing device rankings data, for example, on printing data storage 112.

Returning to step 956, if a determination is made that ranking results are not to be grouped, then the process proceeds to step 964 where the saved ranking track data items are retrieved for all printing devices and all printing devices are ranked based upon the ranking track data items.

H. Ranking Example

Figure 10:
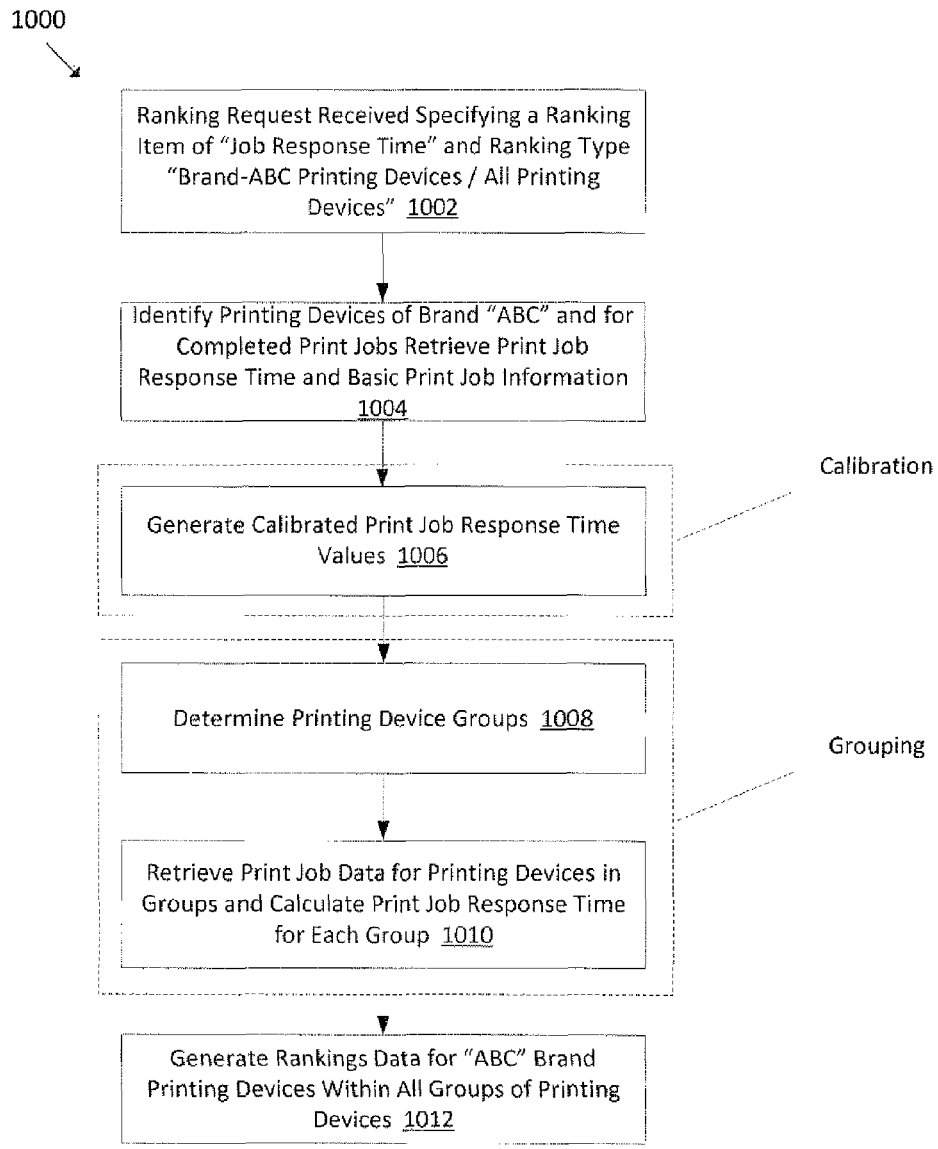
FIG. 10 is a flow diagram that depicts a ranking example.

FIG. 10 is a flow diagram 1000 that depicts a ranking example according to an embodiment. In step 1002, a ranking request is received that specifies a ranking item of "Job Response Time" and a ranking type of "Brand-ABC Printing Devices/All Printing Devices". In this example, the ranking request requests that printing devices of brand "ABC" be ranked among all printing devices and that the ranking be performed by job response time. The ranking request may be generated, for example, by a user via a graphical user interface that supports the ranking approaches described herein. Alternatively, the ranking request may be generated by an application program or other entity.

In step 1004, the printing devices of brand "ABC" are identified. This may be determined, for example, by examining the printing device information data 120. For the identified printing devices of brand "ABC", the print job response time and basic print job information 500 are retrieved for the completed print jobs.

In step 1006, calibrated print job response time values are generated based upon the raw print job response times and a specified calibration policy. The specified calibration policy may specify the type of basic print job information 500 that is to be used to calibrate the print job response time values. As one example, the specified calibration policy may specify that the file size data from the basic print job information 500 is to be used to calibrate the print job response time values. The calibrated print job response time values may be stored, for example, on print data storage 112.

In step 1008, printing device groups are determined based upon the ranking request. In the present example, printing device groups are determined based upon brand value. In step 1010, the print job data 122 is retrieved for each printing device in each group and a print job response time is calculated for each group. In the present example, for each group of printing devices with the same brand value, the calibrated print job response times for the member printing devices are averaged to provide a print job response time for the group.

In step 1012, rankings data is generated that indicates the ranking of the "ABC" brand printing device group within all groups of printing devices. The rankings data may be stored in printing data storage 112 and may also be displayed to a user via a graphical user interface.

I. User Interface Examples

Figure 11A:
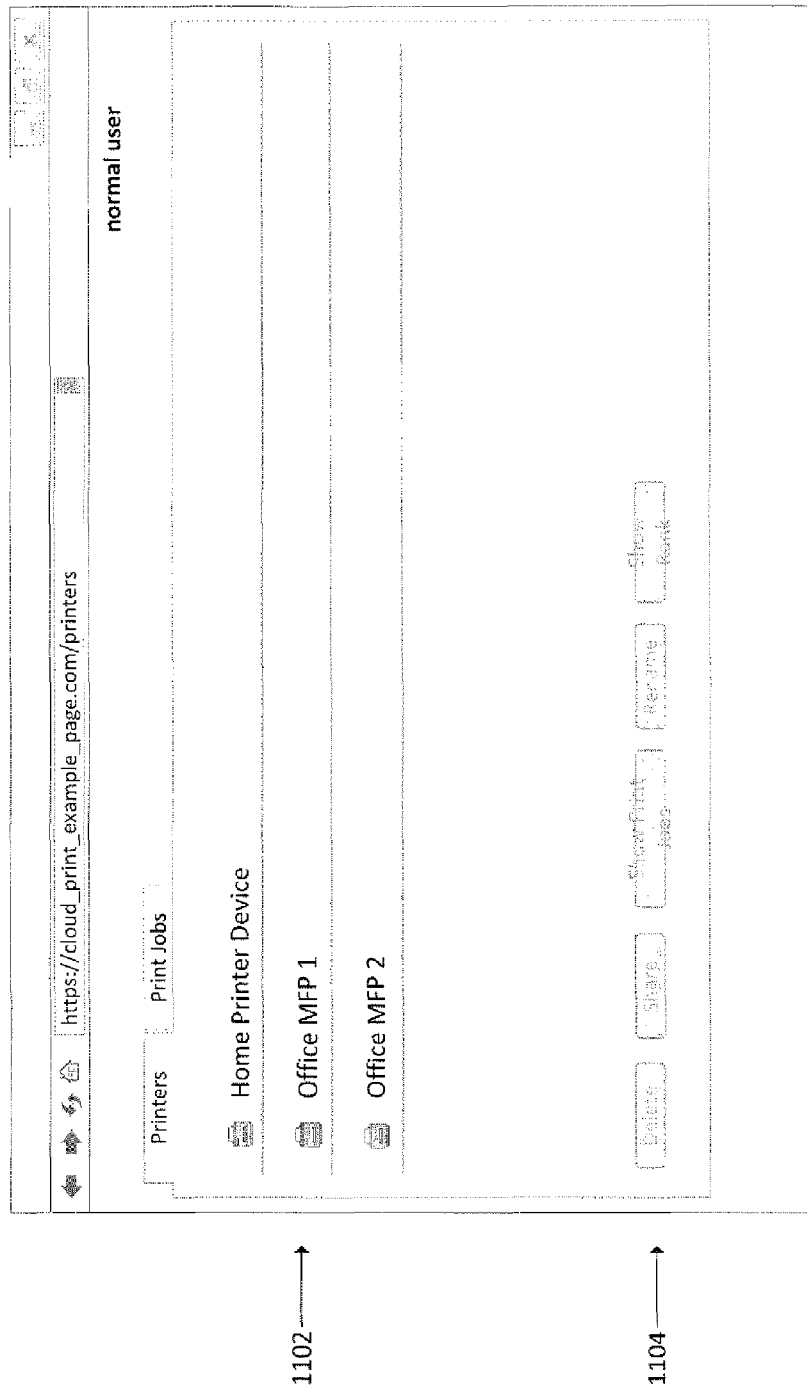
FIG. 11A depicts an example graphical user interface that allows a user to select a particular printing device and then request a ranking of the selected printing device.

The approaches described herein for ranking cloud printing devices may be implemented in a wide variety of ways that may vary depending upon a particular implementation. FIG. 11A depicts an example graphical user interface 1100 that allows a user to select a particular printing device and then request a ranking of the selected printing device. User interface controls 1102 allow a user to select a printing device and user interface controls 1104 allow a user to select an action to be performed with respect to the selected printing device. The user interface controls 1104 include a "Show Rank" option which, when selected, provides a ranking of the selected printing device within all printing devices.

Figure 11B:
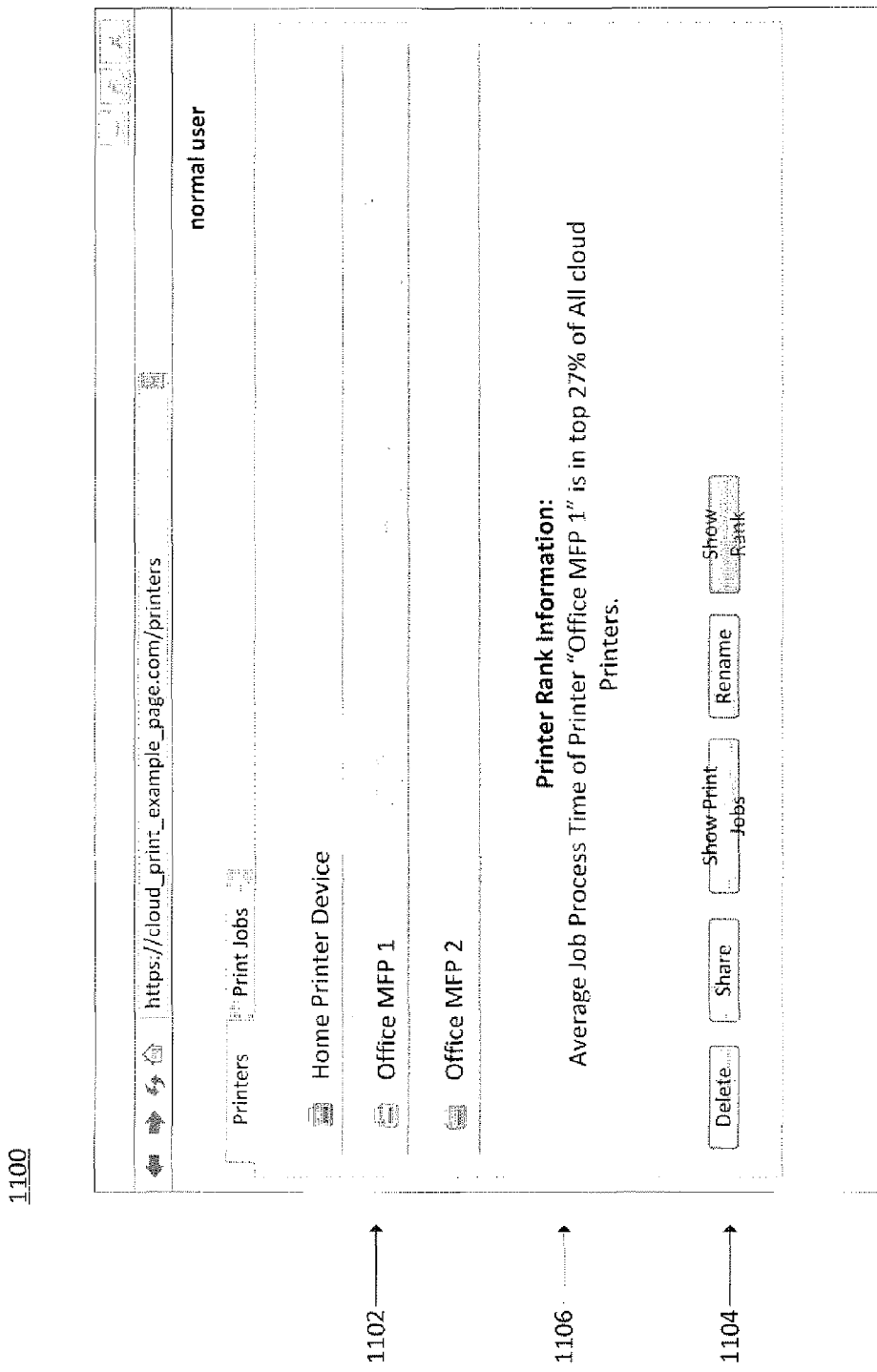
FIG. 11B depicts the result of a user selecting the printing device named "Office MFP 1" and requesting a ranking of this printing device by selecting the "Show Rank" user interface control.

FIG. 11B depicts the result of a user selecting the printing device named "Office MFP 1" and requesting a ranking of this printing device by selecting the "Show Rank" user interface control 1104. Ranking results 1106 are generated and displayed to the user on the graphical user interface 1100. In this example, the ranking results 1106 indicate that the average print job process time of the printing device "Office MFP 1" is in the top 27% of all cloud printing devices.

Figure 11C:
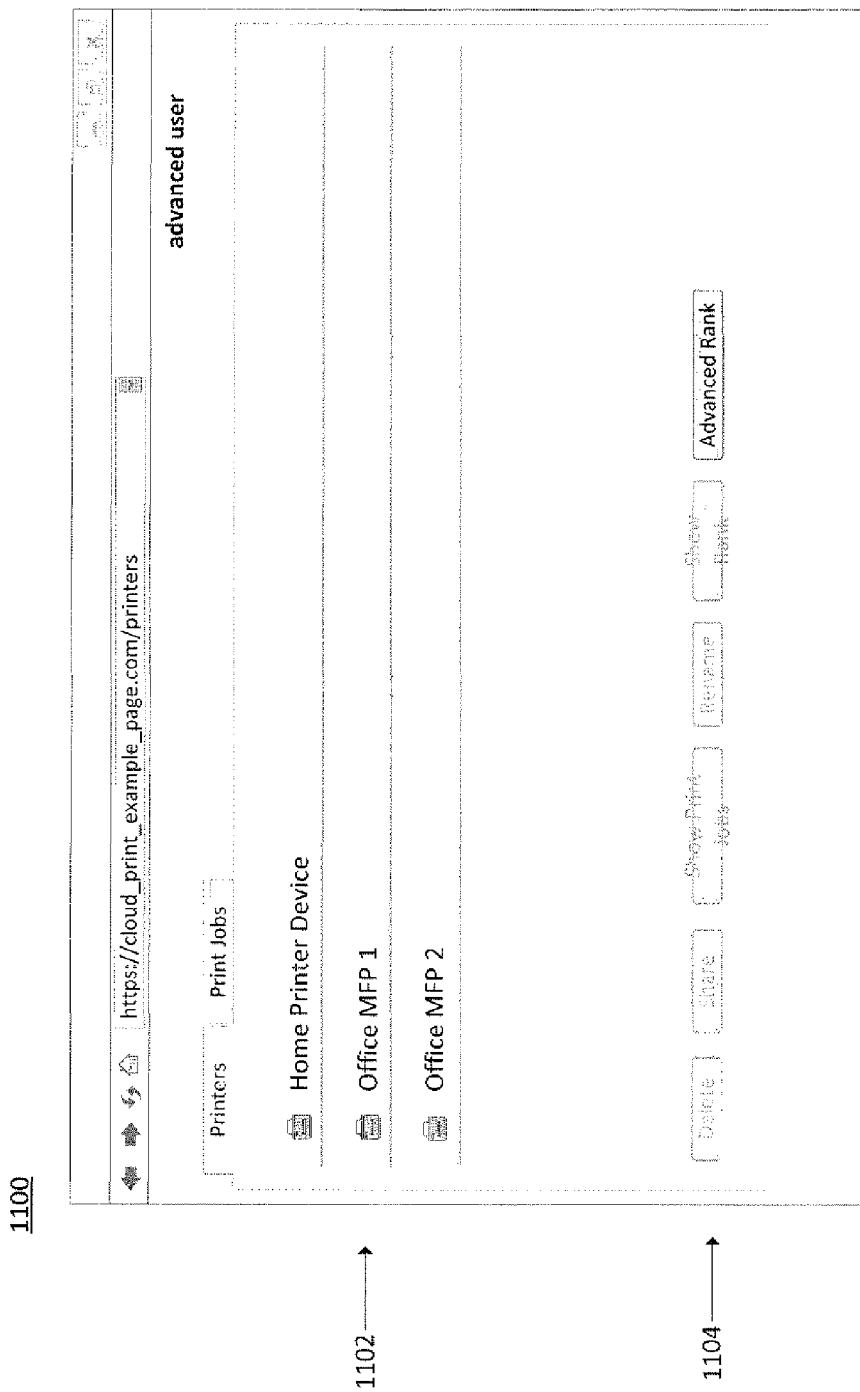
FIGS. 11C and 11D depict the use of an advanced ranking feature.
Figure 11D:
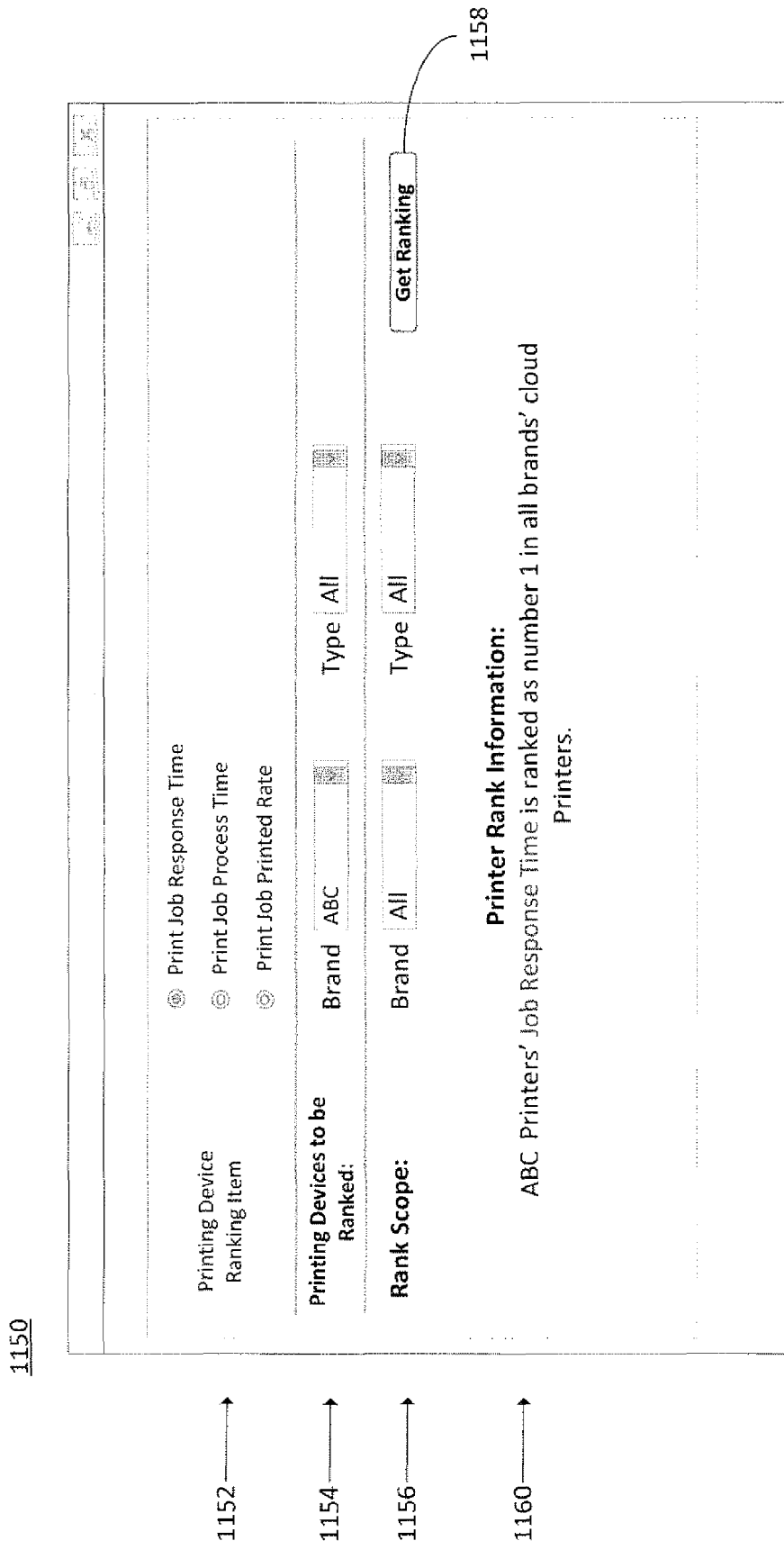

FIGS. 11C and 11D depict the use of an advanced ranking feature according to an embodiment. In FIG. 11C, the user interface controls 1104 include an "Advanced Rank" option. When a user selects a particular printing device and then the "Advanced Rank" user interface control, then as depicted in FIG. 11D, the user is presented with a graphical user interface 1150 that includes user interface controls 1152 for selecting a printing device ranking item 602. The printing device ranking items are different types of print job process data 504 that are used for ranking printing devices. In the present example, the user interface controls 1152 allow a user to select print job response time, print job process time or print job printed rate as a printing device ranking item. Graphical user interface 1150 also includes user interface controls 1154 for selecting printing devices to be ranked. In the present example, a user may select printing devices to be ranked based upon brand and type. The selectable attributes depicted in FIG. 11D for printing devices to be ranked are examples and in other implementations, any number of other printing device attributes may be made available for selection by a user. Graphical user interface 1150 also includes user interface controls 1156 for selecting a rank scope. In the present example, a user may select a rank scope based upon brand and type. The selectable attributes depicted in FIG. 11D for rank scope are examples and in other implementations, any number of other printing device attributes may be made available for selection by a user. Graphical user interface 1150 also includes a user interface control 1158 "Get Ranking" which, when selected, causes a ranking to be generated and rankings results 1160 to be displayed. In the present example, the rankings results 1160 indicate that that the ABC brand printing devices have the highest ranked print job response time among all cloud printing devices.

IV. Implementation Mechanisms

Although the flow diagrams of the present application depict a particular set of steps in a particular order, other implementations may use fewer or more steps, in the same or different order, than those depicted in the figures. According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
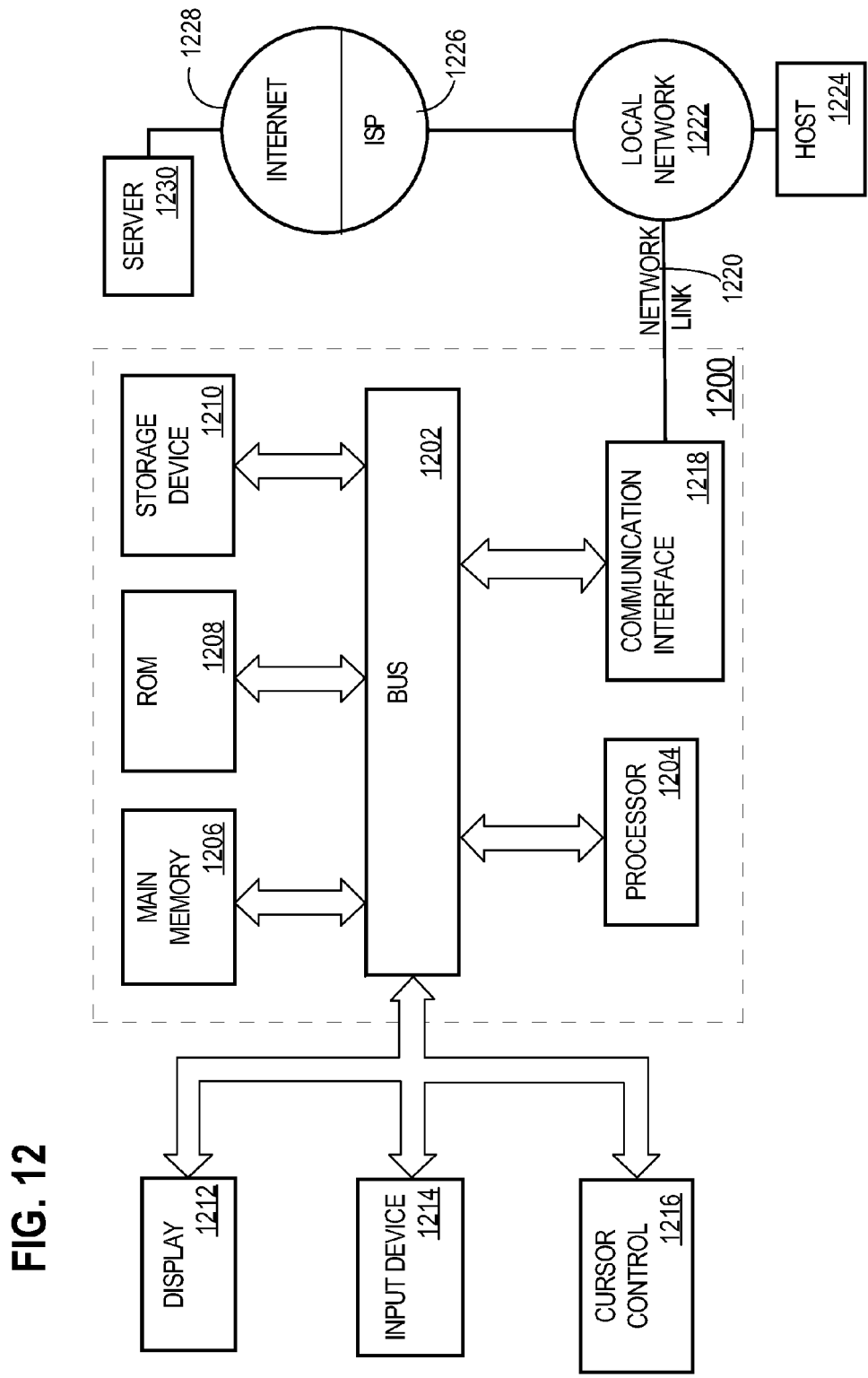
FIG. 12 is a block diagram that depicts an example computer system upon which embodiments may be implemented.

FIG. 12 is a block diagram that depicts an example computer system 1200 upon which embodiments may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. Although bus 1202 is illustrated as a single bus, bus 1202 may comprise one or more buses. For example, bus 1202 may include without limitation a control bus by which processor 1204 controls other devices within computer system 1200, an address bus by which processor 1204 specifies memory locations of instructions for execution, or any other type of bus for transferring data or signals between components of computer system 1200.

An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic or computer software which, in combination with the computer system, causes or programs computer system 1200 to be a special-purpose machine. According to one embodiment, those techniques are performed by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 1200, various computer-readable media are involved, for example, in providing instructions to processor 1204 for execution. Such a medium may take many forms, including but not limited to, non-volatile media and volatile media. Non-volatile media includes, for example, optical or magnetic disks, such as storage device 1210. Volatile media includes dynamic memory, such as main memory 1206. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. The received code may be executed by processor 1204 as it is received, and/or stored in storage device 1210, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
a printing device ranking service configured to:
retrieve printing device information data that specifies one or more attributes of a plurality of printing devices,
retrieve print job data that specifies one or more attributes of a plurality of print jobs that have previously been processed by the plurality of printing devices, and
determine, based at least upon the printing device information data and the print job data, rankings data for the plurality of printing devices, wherein the rankings data indicate a ranking of the printing devices from the plurality of printing devices.

2. The apparatus of claim 1, wherein the printing device information data includes one or more of identification data, brand data, model data or type data.

3. The apparatus of claim 1, wherein:
the print job data indicates for each print job from the plurality of print jobs that have previously been processed by the plurality of printing devices, one or more of a print job response time, a print job processing time or a job printed success indication, and
the determining, based at least upon the printing device information data and the print job data, rankings data for the plurality of printing devices, includes determining the rankings data for the plurality of printing devices based at least upon the printing device information data and one or more of the print job response time, the print job processing time or the job printed success indication.

4. The apparatus of claim 1, wherein the determining, based at least upon the printing device information data and the print job data, rankings data for the plurality of printing devices, includes:
determining, based upon the printing device information data, two or more groups of printing devices from the plurality of printing devices, and
determining grouped rankings data for each group of printing devices from the two or more groups of printing devices, wherein the grouped rankings data indicates a ranking of the two or more groups of printing devices.

5. The apparatus of claim 1, wherein:
the print job data includes basic print job information, print job settings data and print job process data,
the printing device ranking service is further configured to determine calibrated print job process data based upon the print job process data and one or more of the basic print job information or the print job settings data, and
the determining, based at least upon the printing device information data and the print job data, rankings data for the plurality of printing devices, includes determining the rankings data for the plurality of printing devices based upon the printing device information data and the calibrated print job process data.

6. The apparatus of claim 1, wherein:
the print job data includes basic print job information, print job settings data and print job process data,
the print job process data indicates for each of the plurality of print jobs that have previously been processed by the plurality of printing devices, one or more of a print job response time, a print job processing time or a job printed success indication,
the printing device ranking service is further configured to determine, based upon the print job process data and one or more of the basic print job information or the print job settings data, one or more of one or more calibrated print job response times, one or more print job processing times, or one or more job printed success indications, and
the determining, based at least upon the printing device information data and the print job data, rankings data for the plurality of printing devices, includes determining the rankings data for the plurality of printing devices based upon the printing device information data and the one or more calibrated print job response times, the one or more print job processing times, or the one or more job printed success indications.

7. The apparatus of claim 1, wherein:
the printing device ranking service is further configured to determine, for one or more printing devices from the plurality of printing devices, statistical data that indicates how two or more of the plurality of print jobs were processed on the one or more printing devices, and
the determining, based at least upon the printing device information data and the print job data, a ranking for the plurality of printing devices is performed using the statistical data for the one or more printing devices.

8. One or more non-transitory computer-readable media storing instructions which, when processed by one or more processors, cause:
a printing device ranking service to:
retrieve printing device information data that specifies one or more attributes of a plurality of printing devices,
retrieve print job data that specifies one or more attributes of a plurality of print jobs that have previously been processed by the plurality of printing devices, and
determine, based at least upon the printing device information data and the print job data, rankings data for the plurality of printing devices, wherein the rankings data indicate a ranking of the printing devices from the plurality of printing devices.

9. The one or more non-transitory computer-readable media of claim 8, wherein the printing device information data includes one or more of identification data, brand data, model data or type data.

10. The one or more non-transitory computer-readable media of claim 8, wherein:
the print job data indicates for each print job from the plurality of print jobs that have previously been processed by the plurality of printing devices, one or more of a print job response time, a print job processing time or a job printed success indication, and
the determining, based at least upon the printing device information data and the print job data, rankings data for the plurality of printing devices, includes determining the rankings data for the plurality of printing devices based at least upon the printing device information data and one or more of the print job response time, the print job processing time or the job printed success indication.

11. The one or more non-transitory computer-readable media of claim 8, wherein the determining, based at least upon the printing device information data and the print job data, rankings data for the plurality of printing devices, includes:
    determining, based upon the printing device information data, two or more groups of printing devices from the plurality of printing devices, and
    determining grouped rankings data for each group of printing devices from the two or more groups of printing devices, wherein the grouped rankings data indicates a ranking of the two or more groups of printing devices.

12. The one or more non-transitory computer-readable media of claim 8, wherein:
    the print job data includes basic print job information, print job settings data and print job process data,
    the one or more non-transitory computer-readable media further comprises additional instructions which, when processed by the one or more processors, cause the printing device ranking service to determine calibrated print job process data based upon the print job process data and one or more of the basic print job information or the print job settings data, and
    the determining, based at least upon the printing device information data and the print job data, rankings data for the plurality of printing devices, includes determining the rankings data for the plurality of printing devices based upon the printing device information data and the calibrated print job process data.

13. The one or more non-transitory computer-readable media of claim 8, wherein:
    the print job data includes basic print job information, print job settings data and print job process data,
    the print job process data indicates for each of the plurality of print jobs that have previously been processed by the plurality of printing devices, one or more of a print job response time, a print job processing time or a job printed success indication,
    the one or more non-transitory computer-readable media further comprises additional instructions which, when processed by the one or more processors, cause the printing device ranking service to determine, based upon the print job process data and one or more of the basic print job information or the print job settings data, one or more of one or more calibrated print job response times, one or more print job processing times, or one or more job printed success indications, and
    the determining, based at least upon the printing device information data and the print job data, rankings data for the plurality of printing devices, includes determining the rankings data for the plurality of printing devices based upon the printing device information data and the one or more calibrated print job response times, the one or more print job processing times, or the one or more job printed success indications.

14. The one or more non-transitory computer-readable media of claim 8, wherein:
    the one or more non-transitory computer-readable media further comprises additional instructions which, when processed by the one or more processors, cause the printing device ranking service to determine, for one or more printing devices from the plurality of printing devices, statistical data that indicates how two or more of the plurality of print jobs were processed on the one or more printing devices, and
    the determining, based at least upon the printing device information data and the print job data, a ranking for the plurality of printing devices is performed using the statistical data for the one or more printing devices.

15. A computer-implemented method comprising:
a printing device ranking service:
    retrieving printing device information data that specifies one or more attributes of a plurality of printing devices,
    retrieving print job data that specifies one or more attributes of a plurality of print jobs that have previously been processed by the plurality of printing devices, and
    determining, based at least upon the printing device information data and the print job data, rankings data for the plurality of printing devices, wherein the rankings data indicate a ranking of the printing devices from the plurality of printing devices.

16. The computer-implemented method of claim 15, wherein the printing device information data includes one or more of identification data, brand data, model data or type data.

17. The computer-implemented method of claim 15, wherein:
    the print job data indicates for each print job from the plurality of print jobs that have previously been processed by the plurality of printing devices, one or more of a print job response time, a print job processing time or a job printed success indication, and
    the determining, based at least upon the printing device information data and the print job data, rankings data for the plurality of printing devices, includes determining the rankings data for the plurality of printing devices based at least upon the printing device information data and one or more of the print job response time, the print job processing time or the job printed success indication.

18. The computer-implemented method of claim 15, wherein the determining, based at least upon the printing device information data and the print job data, rankings data for the plurality of printing devices, includes:
    determining, based upon the printing device information data, two or more groups of printing devices from the plurality of printing devices, and
    determining grouped rankings data for each group of printing devices from the two or more groups of printing devices, wherein the grouped rankings data indicates a ranking of the two or more groups of printing devices.

19. The computer-implemented method of claim 15, wherein:
    the print job data includes basic print job information, print job settings data and print job process data,
    the computer-implemented method further comprises the printing device ranking service determining calibrated print job process data based upon the print job process data and one or more of the basic print job information or the print job settings data, and
    the determining, based at least upon the printing device information data and the print job data, rankings data for the plurality of printing devices, includes determining the rankings data for the plurality of printing devices based upon the printing device information data and the calibrated print job process data.

20. The computer-implemented method of claim 15, wherein:
    the print job data includes basic print job information, print job settings data and print job process data,
    the print job process data indicates for each of the plurality of print jobs that have previously been processed by the plurality of printing devices, one or more of a print job response time, a print job processing time or a job printed success indication,
    the computer-implemented method further comprises the printing device ranking service determining, based upon the print job process data and one or more of the basic print job information or the print job settings data, one or more of one or more calibrated print job response times, one or more print job processing times, or one or more job printed success indications, and the determining, based at least upon the printing device information data and the print job data, rankings data for the plurality of printing devices, includes determining the rankings data for the plurality of printing devices based upon the printing device information data and the one or more calibrated print job response times, the one or more print job processing times, or the one or more job printed success indications.

\* \* \* \* \*